Patented May 1, 1934

1,957,385

UNITED STATES PATENT OFFICE 1,957,385

DEODORANT

John S. Brogdon, Atlanta, Ga., assignor to Robert T. Jones, Jr., Atlanta, Ga.

No Drawing. Application April 22, 1929, Serial No. 357,360. Renewed March 14, 1934

1 Claim. (Cl. 252—2.5)

The invention relates to means for deodorizing the atmosphere in confined spaces, such as iceboxes, refrigerators and the like, and is based upon the discovery that trisodium phosphate or the derivatives thereof will absorb and destroy odors, particularly the objectionable odors arising from the storage of foodstuffs in confined spaces, such as refrigerators, which odors would otherwise contaminate other food or products than those from which they emanate. It is well known that trisodium phosphate will ionize in the presence of water forming caustic soda and a phosphate. The use of trisodium phosphate for the purposes above described is novel in that the water for the ionization of the trisodium phosphate is supplied by the moisture in the air. The caustic soda is thus formed when and as needed and when so formed produces an alkaline condition highly desirable for the accomplishment of the purposes noted.

Preferably the trisodium phosphate in granular form is contained in a porous or foraminated receptacle, such as a metal box with perforated walls, a cloth or similar fabric bag, and, in order to insure a ready diffusion of the air through the body of the trisodium phosphate, the same is preferably admixed with a comminuted solid, such as broken glass, charcoal, pebbles or the like, which separates the individual particles of the granular deodorant and facilitates access of air to the same. The receptacle containing the body of granular trisodium phosphate preferably admixed with the solid comminuted separator as described, is placed in the confined space in which the odors emanate, so that the air laden with the objectionable odors coming into contact with the trisodium phosphate will be immediately deodorized.

In the case of the deodorization of air in large refrigerators or cold storage plants, the air therein may be completely deodorized by forcing the same through a scrubber or similar receptacle containing granular trisodium phosphate alone or admixed with a comminuted solid to facilitate the passage of air therethrough by means of a suitable blower.

What I claim is:

A deodorant for air in confined spaces comprising granular trisodium phosphate admixed with a comminuted solid to promote diffusion of air therethrough.

JOHN S. BROGDON.